(12) United States Patent
Madole et al.

(10) Patent No.: US 12,113,671 B2
(45) Date of Patent: Oct. 8, 2024

(54) BEHAVIOR DRIVEN DIGITAL TWIN FOR INTERNET OF THINGS DEVICES

(71) Applicant: Yonomi, Inc., Boulder, CO (US)

(72) Inventors: Garett Madole, Austin, TX (US); Brandon Valosek, Austin, TX (US); Anand Surada, Austin, TX (US)

(73) Assignee: Yonomi, LLC, Boulder, CO (US)

( * ) Notice: Subject to any disclaimer, the term of this patent is extended or adjusted under 35 U.S.C. 154(b) by 0 days.

(21) Appl. No.: 17/722,144

(22) Filed: Apr. 15, 2022

(65) Prior Publication Data
US 2023/0067162 A1 Mar. 2, 2023

Related U.S. Application Data

(60) Provisional application No. 63/176,175, filed on Apr. 16, 2021.

(51) Int. Cl.
*H04L 41/082* (2022.01)
(52) U.S. Cl.
CPC .................... *H04L 41/082* (2013.01)
(58) Field of Classification Search
CPC .................................................... H04L 41/082
See application file for complete search history.

(56) References Cited

U.S. PATENT DOCUMENTS

| | | | | |
|---|---|---|---|---|
| 10,412,190 | B1 * | 9/2019 | Roche | H04L 67/55 |
| 2015/0348554 | A1 * | 12/2015 | Orr | H04L 12/282 |
| | | | | 704/275 |
| 2020/0244740 | A1 | 7/2020 | Ko | |
| 2020/0311025 | A1 * | 10/2020 | Singh | G06F 11/1004 |
| 2022/0046094 | A1 * | 2/2022 | Hart | H04L 67/12 |

FOREIGN PATENT DOCUMENTS

| | | |
|---|---|---|
| CN | 112382064 A | 2/2021 |
| WO | 2020/056277 A1 | 3/2020 |

OTHER PUBLICATIONS

International Search Report and Written Opinion, PCT Appln. No. PCT/US22/025090, Jul. 8, 2022, 11 pgs.

* cited by examiner

*Primary Examiner* — Ario Etienne
*Assistant Examiner* — Kidest Mendaye
(74) *Attorney, Agent, or Firm* — Taft Stettinius & Hollister LLP

(57) ABSTRACT

Systems, methods, and storage media for communicating with connected devices are disclosed. Exemplary implementations may: identify one or more traits for a connected device; receive an action request, wherein the action request corresponds to a first desired state of the connected device; receive a trait configuration for the one or more traits; calculate a second desired state for the connected device, wherein the second desired state is calculated based on one or more of the action request and trait configuration for the connected device; and at least one of transmit a first message to the connected device, including an indication of the first or the second desired state, or transmit a second message, including an indication of an estimated state, to the first computing device.

17 Claims, 7 Drawing Sheets

BEHAVIOR DRIVEN DIGITAL TWIN FOR INTERNET OF THINGS DEVICES

CLAIM OF PRIORITY UNDER 35 U.S.C. § 119

The present Application for Patent claims priority to U.S. Provisional Application No. 63/176,175, entitled "Behavior Driven Digital Twin for Internet of Things Devices," filed Apr. 16, 2021, and assigned to the assignee hereof, which is hereby expressly incorporated by reference herein.

FIELD OF THE DISCLOSURE

The present disclosure relates generally to the Internet of Things (IoT). In particular, but not by way of limitation, the present disclosure relates to systems, methods and apparatuses for representing IoT devices as well as their behavior.

DESCRIPTION OF RELATED ART

Existing systems provide "device twins" or a representation of an Internet of Things (IoT) device's state. For instance, a device twin could have the state "power=true" indicating that a device is turned on. AMAZON WEB SERVICES (AWS) calls these device twins "shadows" and MICROSOFT AZURE calls them "device twins."

Existing systems also provide a trait or capability model to represent what an IoT device can do. These are typically interfaced definitions. Sometimes, these models define actions and states that are compatible with an IoT device. AMAZON terms these "capabilities" and wraps them inside its "controllers," while GOOGLE calls them "traits."

However, device twins and trait or capability models have been independent to this point.

The description provided in the Description of Related Art section should not be assumed to be prior art merely because it is mentioned in or associated with the background section. The Description of Related Art section may include information that describes one or more aspects of the subject technology.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a method for communicating with connected devices, the method comprising: identifying one or more traits for a connected device; receiving, from a first computing device, an action request, wherein the action request corresponds to a first desired state of the connected device; receiving, via an internet or cellular data connection, a trait configuration for the one or more traits corresponding to the connected device; calculating, at a controller, a second desired state for the connected device, wherein the second desired state is calculated based on one or more of the action request and the trait configuration for the connected device; and at least one of: transmitting a first message to the connected device, the first message including an indication of the first or the second desired state; transmitting a second message to the first computing device, the second message including an indication of an estimated state of the connected device.

Some embodiments of the disclosure may be characterized as a system configured for communicating with connected devices, the system comprising one or more hardware processors configured by machine-readable instructions to: identify one or more traits for a connected device; receive, from a first computing device, an action request, wherein the action request corresponds to a first desired state of the connected device; receive, via an internet or cellular data connection, a trait configuration for the one or more traits corresponding to the connected device; calculate a second desired state for the connected device, wherein the second desired state is calculated based on one or more of the action request and the trait configuration for the connected device; and at least one of: transmit a first message to the connected device, the first message including an indication of the first or the second desired state; transmit a second message to the first computing device, the second message including an indication of an estimated state of the connected device.

Some embodiments of the disclosure may be characterized as a non-transient computer-readable storage medium having instructions embodied thereon, the instructions being executable by one or more processors to perform a method for communicating with connected devices, the method comprising: identifying one or more traits for a connected device; receiving, from a first computing device, an action request, wherein the action request corresponds to a first desired state of the connected device; receiving, via an internet or cellular data connection, a trait configuration for the one or more traits corresponding to the connected device; calculating, at a controller, a second desired state for the connected device, wherein the second desired state is calculated based on one or more of the action request and the trait configuration for the connected device; and at least one of: transmitting a first message to the connected device, the first message including an indication of the first or the second desired state; transmitting a second message to the first computing device, the second message including an indication of an estimated state of the connected device.

Some examples of the method, system, and non-transient computer-readable storage medium described above may further include processes, features, means, or instructions for refraining from transmitting to the connected device, information pertaining to the action request based on the estimated state of the connected device.

Some examples of the method, system, and non-transient computer-readable storage medium described above may further include processes, features, means, or instructions for receiving one or more state snapshots for the one or more traits for the connected device, wherein each of the one or more state snapshots comprises one or more state fields.

Some examples of the method, system, and non-transient computer-readable storage medium described above may further include processes, features, means, or instructions for receiving one or more of an updated trait configuration, and an updated state snapshot for at least one of the one or more state snapshots, for the connected device, based on transmitting the request to the connected device, and calculating a third desired state for the connected device.

In some examples of the method, system, and non-transient computer-readable storage medium described above, each of the one or more traits is associated with one or more of a capability, a functionality, and a behavior of the connected device.

In some examples of the method, system, and non-transient computer-readable storage medium described above, the second desired state calculated by the controller is different from the first desired state corresponding to the action request received from the first computing device.

In some examples of the method, system, and non-transient computer-readable storage medium described above, the request includes an indication of the second desired state. Further, some examples of the method, system, and non-transient computer-readable storage medium described above may further include processes, features, means, or instructions for calculating an expected state for the connected device, the expected state based upon one or more of the action request, a behavior model, and the trait configuration for the connected device, receiving, from the connected device, a reported state, determining at least one error or issue for the connected device based on identifying a discrepancy between the reported state and the expected state. In some examples of the method, system, and non-transient computer-readable storage medium described above, the second message further includes an indication of the error or the issue.

In some examples of the method, system, and non-transient computer-readable storage medium described above, the request includes an indication of the first desired state. Further, some examples of the method, system, and non-transient computer-readable storage medium described above may further include processes, features, means, or instructions for calculating an expected state, the expected state based upon one or more of the action request, a behavior model, and the trait configuration for the connected device, determining an error or issue for the connected device based on one of receiving a reported state from the connected device, wherein the reported state is different from the expected state, or identifying an absence of an error response, an updated state, or a reported state from the connected device. Some examples of the method, system, and non-transient computer-readable storage medium described above may further include processes, features, means, or instructions for transmitting a third message to the connected device, the third message including an indication of a third desired state for the connected device, and wherein the third message is transmitted based upon determining the error or the issue for the connected device.

Some examples of the method, system, and non-transient computer-readable storage medium described above may further include processes, features, means, or instructions for receiving, from the connected device, a reported state, and refraining from transmitting information pertaining to the action request to the connected device based at least in part on identifying that the first desired state is the same as or approximately the same as the reported state.

Some examples of the method, system, and non-transient computer-readable storage medium described above may further include processes, features, means, or instructions for validating the action request, wherein the validating comprises assessing the action request with respect to the trait configuration for the connected device, generating an action intent from the action request, wherein generating the action intent is based at least in part on validating the action request, and wherein calculating the second desired state is further based on the action intent and a reported state of the connected device.

Some examples of the method, system, and non-transient computer-readable storage medium described above may further include processes, features, means, or instructions for receiving a traits payload for the connected device, the traits payload comprising the trait configuration and a state snapshot, parsing the traits payload, based at least in part on sourcing one or more data contracts, the one or more data contracts selected from a group consisting of configuration property definitions, state property definitions, and action definitions, receiving additional trait data for the connected device, the additional trait data including information pertaining to one or more validation sources, trait constraints, and action validations, and validating one or more of a pending state update and a pending property update for the connected device based on the parsed traits payload and the additional trait data.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
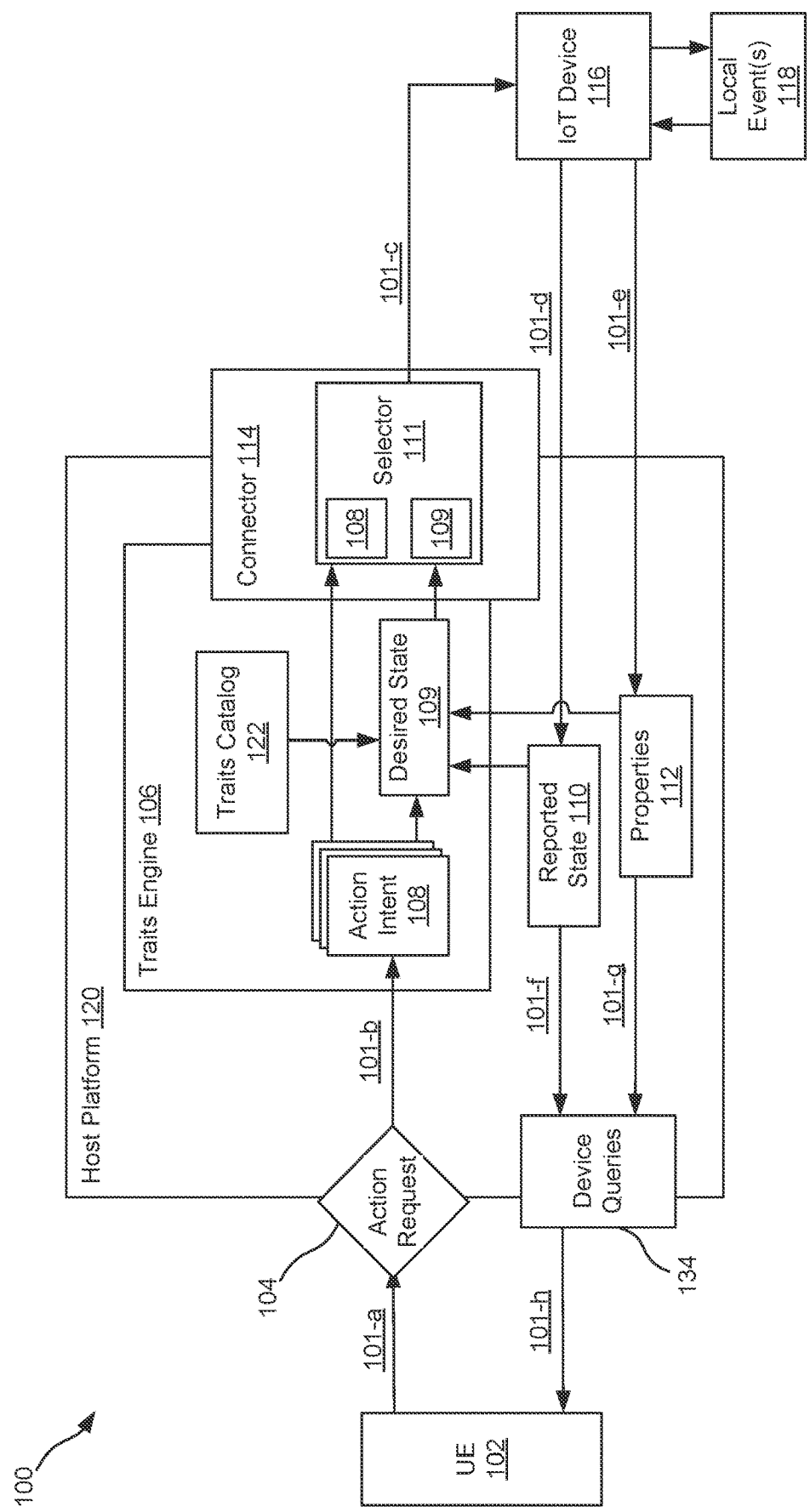
FIG. 1 illustrates a block diagram depicting an example of a system implementing a traits engine, in accordance with various aspects of the disclosure.

The word "for example" is used herein to mean "serving as an example, instant, or illustration." Any embodiment described herein as "for example" or any related term is not necessarily to be construed as preferred or advantageous over other embodiments.

Additionally, a reference to a "device" is not meant to be limiting to a single such device. It is contemplated that numerous devices may comprise a single "device" as described herein.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

The detailed descriptions which follow are presented in part in terms of algorithms and symbolic representations of operations on data within a computer memory wherein such data often represents numerical quantities, alphanumeric characters or character strings, logical states, data structures, or the like. A computer generally includes one or more processing mechanisms for executing instructions, and memory for storing instructions and data.

When a general-purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

In the descriptions herein, operations and manipulations are often described in terms, such as comparing, sorting, selecting, or adding, which are commonly associated with mental operations performed by a human operator. It should be understood that these terms are employed to provide a clear description of an embodiment of the present invention, and no such human operator is necessary, nor desirable in most cases.

This requirement for machine implementation for the practical application of the algorithms is understood by those persons of skill in this art as not a duplication of human thought, rather as significantly more than such human capability. Useful machines for performing the operations of one or more embodiments of the present invention include general purpose digital computers or other similar devices. In all cases the distinction between the method operations in operating a computer and the method of computation itself should be recognized. One or more embodiments of the present invention relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher-level coding of the instructions that is interpreted to obtain the actual computer code.

The software module may also include a hardware component, wherein some aspects of the algorithm are performed by the circuitry itself rather as a result of an instruction.

Some embodiments of the present invention rely on an apparatus for performing disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

In the following description, several terms which are used frequently have specialized meanings in the present context.

In the description of embodiments herein, frequent use is made of the terms server, client, and client/server architecture. In this context, a server and client are each instantiations of a set of functions and capabilities intended to support distributed computing. These terms are often used to refer to a computer or computing machinery, yet it should be appreciated that the server or client function is provided by machine execution of program instructions, threads, modules, processes, or applications. The client computer and server computer are often, but not necessarily, geographically separated, although the salient aspect is that client and server each perform distinct, but complementary functions to accomplish a task or provide a service. The client and server accomplish this by exchanging data, messages, and often state information using a computer network, or multiple networks. It should be appreciated that in a client/server architecture for distributed computing, there are typically multiple servers and multiple clients, and they do not map to each other and further there may be more servers than clients or more clients than servers. A server is typically designed to interact with multiple clients.

In networks, bi-directional data communication (i.e., traffic) occurs through the transmission of encoded light, electrical, or radio signals over wire, fiber, analog, digital cellular, Wi-Fi, or personal communications service (PCS) media, or through multiple networks and media connected by gateways or routing devices. Signals may be transmitted through a physical medium such as wire or fiber, or via wireless technology using encoded radio waves. Much wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), Fifth Generation (5G), personal digital cellular (PDC), or through packet-data technology over analog systems such as cellular digital packet data (CDPD).

As used herein, the terms "IoT device" and "connected device" may be used interchangeably throughout the disclosure. Additionally, the terms "host platform" and "controller" may be used interchangeably throughout the disclosure. Lastly, the terms "trait engine" and "calculator" may be used interchangeably throughout the disclosure. As used herein, the term "desired state" may refer to a desired state corresponding to an action request or action intent, or a desired state that is computed by the host platform of the present disclosure.

Broadly, this disclosure describes embodiments where a device twin is combined with trait or capability models to form a single synergized model that allows the device twin to embody not just a state of a connected device (e.g., Internet of Things or IoT device), but also behavior of the connected device. Existing control systems encounter some difficulties when a desired action (e.g., indicated by a user) is misaligned with a connected device's abilities in a given state. For instance, when an IoT device, such as an automated door lock, is jammed, a user can instruct the device to lock any number of times and yet locking will almost never occur. However, by modeling both the behavior and the states of the IoT device, a controller can provide more useful feedback to the end user, for instance, when an automatic door lock is jammed. Additionally, by taking account of a connected device's state and possible behaviors before passing an instruction from a user to the connected device, the controller can modify the request or refrain from transmitting the request/instruction to the connected device. For instance, the controller may choose not to pass additional "open requests" from a user to the automatic door lock when the door lock informs the controller that it is jammed.

An important recognition of this disclosure is that the concept of setting a connected device's state is not always guaranteed. In other words, a user (e.g., via a user equipment or UE) cannot always control a device's state, as there are too many real-world variables (e.g., a door lock jams) to consistently allow such control. In some instances, the connected device is ultimately the one that can control/modify its own state, though this control can be based on a desired state (e.g., in an action request) indicated by the user. Aspects of the present disclosure are directed to a method of controlling a connected device (e.g., IoT device) based on computing a "desired state." In some examples, the desired state is calculated based on one or more of queued action requests (e.g., received from the user), a configuration of the connected device, and a reported state for the connected device, where the reported state may be transmitted from the connected device to a controller (e.g., shown as host platform 120, host platform 220). In some cases, the user may provide an action request (e.g., shown as action request 104), and the connected device may report its state. As described in relation to the figures below, the action request may be intercepted by a host platform and optionally converted into an action intent prior to be being sent to the connected device. Similarly, the host platform or controller intercepts the state reported by the connected device, and optionally, relays this state information to the UE for presenting to the user.

The requested action (or action intent) alone cannot change the state of the connected device but may be used in calculating the desired state for the connected device. The action request received from the end-user may be associated with a first desired state of the connected device. In other words, the action request corresponds to the functionality that the end-user is wishing to perform on the connected device. In some cases, the action intent (derived from the action request) is also associated with the first desired state. Further, the host platform (e.g., host platform 120, 220) calculates a second desired state (also referred to as computed desired state), where the second desired state is the same or different from the first desired state. In particular, the controller (or host platform) calculates the second or computed desired state based on: (1) one or more user action intents, (2) the reported state of the connected device, and (3) configuration/properties of the connected device. In some circumstances, any change in the reported state and/or configuration/properties of the connected device, even without a new user action intent, may trigger the controller to calculate an updated desired state for the connected device. The controller can then determine to either relay the first desired state (e.g., corresponding to the action intent) to the connected device (or IoT device), or alternatively, to refrain from transmitting the request/instruction to the connected device. In yet other cases, the controller or host platform may transmit a message including an indication of another desired state (e.g., the second or computed desired state, where the computed desired state is different from the desired state corresponding to the action intent) to the connected device, for instance, based on assessing the action intent with respect to the current/reported state, properties, configuration, and/or constraints for the connected device.

In existing systems, the controller presumes to know the device's state based on commands from the user—a presumption that is often faulty or based on incomplete information. In accordance with aspects of the disclosure, a user's action request is intercepted by an intermediary, herein referred to as a host platform, rather than being directly sent to the connected device. Said another way, users do not give commands to IoT devices, but rather make requests for state change that may or may not be fulfilled or may be fulfilled in a way that traditional systems would not take (and may consider factors/constraints that the user is not privy to).

At the same time, the IoT cloud backend can influence how desired state is calculated via the use of traits. As used herein, the term "trait" refers to a single composable unit of device capability, functionality, or behavior. In other words, a trait is the lowest-level building block that defines the logical chunk of an IoT device's capability. Non-limiting examples include power, brightness, or color, for instance, for an IoT light bulb. In another non-limiting example, the traits for a pair of IoT speaker(s) may include power, volume, bass, treble, and balance (e.g., left-right speaker balance). By defining traits, the IoT cloud backend can influence how desired state is calculated. According to aspects of the disclosure, the host platform may calculate a desired state for a connected device based in part on traits information received from the IoT cloud backend.

In some instances, a connected device (or IoT device) can implement multiple traits. A device's capabilities can be thought of then as the effective union of all of the traits it implements. A device may implement a single trait multiple times (this is referred to as having multiple trait instances). As an example, a multi-port power strip with individually controllable outputs may implement multiple trait instance. The single device (power strip) may have multiple instances of a "Power" trait, which can be individually controlled to switch an output On or Off. In this example, each instance of the Power trait is associated with a different one of the plurality of controllable outputs (e.g., power outlet) but referenced to a single IoT device (i.e., the multi-port power strip). Furthermore, by keeping traits scoped small and understandable, aspects of the disclosure enable a device's capabilities to be modeled by one or more single-purpose traits. In this context, the term "small" means single purpose (not overly complex), complete (fully models the needed information and behavior) and generally indivisible (cannot be broken down into two or more fully valid and complete traits). It should be noted that, not every single connected device will be able to implement a given trait the exact same way. The host platform of the present disclosure may be configured to model the expected behavior of different types of connected devices known and contemplated in the art, based on their trait data (e.g., configuration, state, or actions). While traits are designed to normalize device behavior and functionality, there is still a desire to allow for alternative or qualified behavior within a trait. This is handled via "trait properties," which are various device-provided configuration properties that impact how a trait functions for a given device that implements it. For instance, in the case of IoT light bulbs, a first IoT bulb that implements the trait "brightness" may use an integer between 1 (dimmest) and 10 (brightest), while a second IoT bulb may use a value between 0% (dimmest) and 100% (brightest). In another example, a first IoT bulb may only accept four (4) values for color, namely green, blue, red, and white, while another IoT bulb may be configured to accept a substantially broader palette (e.g., selected by the user via a color picker wheel), as well as a saturation level between 0% and 100%. The values a connected device provides for its trait properties may impact what actions are available (or how they work), or the potential constraints on various state values associated with the connected device.

In some cases, the traits may be used to define various data interfaces (or contracts) about the expected state for a connected device. Furthermore, the traits may help define the data interfaces for one or more of: device properties, configuration properties, actions and their parameters, and state. Additionally, or alternatively, traits may also be used to define device behavior. For example, the system (e.g., shown as system 100 in FIG. 1) captures expected behavior of traits through action requests (received from the user), and computes the desired state of a connected device as a function of one or more of its queued or outstanding action(s), reported state, pre-existing estimated state (if any), and properties (device properties and/or configuration properties). Thus, a connected device that implements a trait is not only configured to align with a specific set of behavioral expectations (the state-based side effects of action intents) around how its associated data ought to look and adhere to static interface expectations (i.e., since data should be represented in a specific way/have a particular format), it is also configured to implement a set of behavioral models as dictated by its traits. In other words, when a device announces its traits to the controller or host platform, it is also indicating to the controller that it will (1) report data in a specific shape/format, (2) respond to certain actions, (3) and/or adhere to behavioral expectations of the announced traits.

Such a design enables developers (e.g., programming apps or the cloud backend itself) to design apps and systems and implement changes thereto more easily. For instance, requests from the user can be coded as "SetState" commands. Aspects of the disclosure facilitate in reducing the device and/or network overhead, as compared to the prior art. Whereas existing systems line up incoming user requests (or action intents) in a queue that is passed by the network and subsequently processed by the connected device/IoT device, the present disclosure may pre-emptively calculate the desired state prior to passing it to the connected device, or alternatively, refrain from transmitting any information pertaining to the action request based on assessing the action request with respect to device specific information (e.g., current state of connected device, maybe an estimated state or a reported state, device properties, configuration properties, traits data, or any other applicable information). In a way, the controller's calculation of desired state may represent a summary of the queue of action intents, which may serve to avoid the overhead of passing a string of user action requests. For instance, in existing designs, when an automatic door lock is jammed, the user may send the controller a series of repeated "close" requests since the user is not seeing a response to its initial "close" request. In contrast, when the controller of the present disclosure detects an absence of a response to its initial "close request", it may determine that the automatic door lock is in a "jammed" state, where the "jammed" state is also referred to as the estimated state. Accordingly, rather than pass this string of repetitive commands (or overhead) to the connected device, which would not only waste limited networking and IoT processing resources, but also adversely impact the battery life of the automatic door lock, the controller may instead refrain from transmitting any additional information related to the desired state to the door lock, based on the estimated state of the connected device (i.e., since the lock is incapable of taking further action without human physical intervention). Furthermore, the controller may report the estimated state (e.g., jammed state) of the door lock back to the user. This response/message including the indication of the estimated state of the connected device not only optimizes network traffic, but also prevents the IoT device from processing a series of requests that it is incapable of reacting to anyway. Removing unnecessary communication with the connected device may serve to increase battery life (e.g., for the connected device and/or the user equipment), reduce the frequency of battery replacement and/or allow smaller batteries to be designed into the connected device, allow for more efficient use of computational resources (e.g., cache/memory) at the connected device, and/or optimize processing parameters of the processor(s) designed into the device. As used herein, the term "estimated state" refers to the state of the connected device estimated by the controller. The controller may calculate an estimated state, for example, when it determines an error or issue for the connected device. In such cases, the estimated state may be different from the first and the second/computed desired states. In other cases, the estimated state may be the same as the desired state (e.g., first desired state, computed desired state) relayed to the connected device.

In some cases, where a connected device awakes from a sleep state to process requests, the use of desired state and the controller's decision to not pass desired state to the device, may serve to prevent the device from coming out of a sleep or lower power state, further extending battery life. As another example, a user (via their user equipment or UE) may issue an action request to increase the brightness of an IoT light bulb, where the IoT bulb may already be at maximum brightness. Typically, the IoT bulb may receive and process this command, and attempt to update its state based on the command, even though it is unable to increase its brightness. In some circumstances, the IoT bulb may receive one or more additional action requests to increase its brightness from the user, based on the lack of any noticeable change in brightness. Further, the user may in impatience select the same brightness (e.g., maximum brightness, higher than maximum brightness), or alternatively, another brightness that is lower than the maximum brightness. In existing systems, network traffic capacity may be used to transmit both the initial action request and the subsequent action request(s). Further, the IoT bulb may also process these two or more action requests received from the UE. However, in the present disclosure, the controller/host platform refrains from transmitting a desired state that exceeds the maximum permissible brightness of the IoT bulb (i.e., conflicts with the device property constraints). When the subsequent brightness request arrives, the action queue may comprise the initial brightness request (e.g., above the maximum brightness) as well as the secondary brightness request (e.g., below the maximum brightness). Rather than transmit two messages with different desired states, the controller may determine that only the second of the two desired states, i.e., corresponding to the lower brightness, is valid, and the desired state should be set only on the second of the two requests. In this way, and despite the user issuing two separate commands/requests, the controller may only pass a single change in desired state to the IoT bulb, which may serve to optimize network traffic and/or battery life, to name two non-limiting examples.

Furthermore, aspects of the present disclosure may also enable the controller to assess potential issues or errors in an IoT system. With the above-noted behavior modeling, the controller knows that a given desired state should (ideally) lead to a given device state being reported back, referred to as the "expected state". In the absence of such information, or upon determining a discrepancy between the expected state (i.e., expected by the controller based on the behavior modeling) and the reported state (i.e., received from the IoT device), the controller may proceed to identify an error/issue at the connected device. In some examples, this discrepancy between the expected state and the reported state may be used to calculate the estimated state (e.g., IoT door lock is jammed). In such cases, the controller may also transmit a message to the user device including an indication of the estimated state and the error/issue at the IoT device. Additionally, or alternatively, the controller may also employ retry logic to better assess errors/issues at the IoT device. In some examples, the controller may temporarily alter the stored desired state (e.g., without user input), for the purpose of probing the IoT device, and monitor the resulting reported state from the IoT device. Further, the controller (or another entity in the system) may map combinations of the desired state and the reported state to known issues, which may allow the controller to autonomously (or semi-autonomously) perform issue identification.

For the purposes of this disclosure, the term "actions" refers to the commands that are available to be executed on a connected device (e.g., IoT device) based on the traits it implements. In some aspects, they allow an end user to control the connected device over a network or internet connection (e.g., from the cloud). It should be noted that, while action requests/intents targeting a connected device may result in a change in the connected device's desired state, they themselves do not directly affect the reported state (e.g., received from the connected device). As used herein, the term "action intent" refers to a parsed, validated, and optionally modified version of an action request. In some cases, the host platform or controller receives an action request from a UE (associated with an end-user), parses and validates the action request to confirm that the action request is associated with a valid "desired state", converts the action request to an action intent, and relays said action intent to the IoT device. In some cases, the action intent comprises or is associated with a desired state (e.g., power=ON, color=blue, and/or brightness=80% for an IoT bulb) for the connected device. Further, in some examples, the action request and the action intent may be associated with the same desired state.

For the purposes of this disclosure, "state" is the persisted snapshot of data fields associated with a specific trait (e.g., power=ON, color=blue, or brightness=6/10 for an IoT bulb;

power=ON, or volume=44/100 for an IoT speaker; etc.) for a connected device. In some examples, the connected device may update its state, which can be read by the host platform and/or the UE associated with the end-user. A connected device may update its state at any time (for example, in response to a local change or sensor reading), or in response to an action (such as unlocking a lock after an end-user presses a button in an app). As used herein, the term "reported state" may refer to an updated state, e.g., read from, reported by, an IoT device.

For the purposes of this disclosure, the "traits engine" or "calculator" refers to a codebase and related libraries, which is distinct from the traits in the traits catalog. In other words, the traits engine (e.g., shown as traits engine 106 in FIG. 1, calculator 207 in FIG. 2) is a runtime framework defined by the trait catalog that the traits engine is running. In contrast, traits are specific values/parameters that the traits engine operates with. In other words, the traits engine/calculator may have no notion of specific traits, such as Power or Color.

Figure 5:
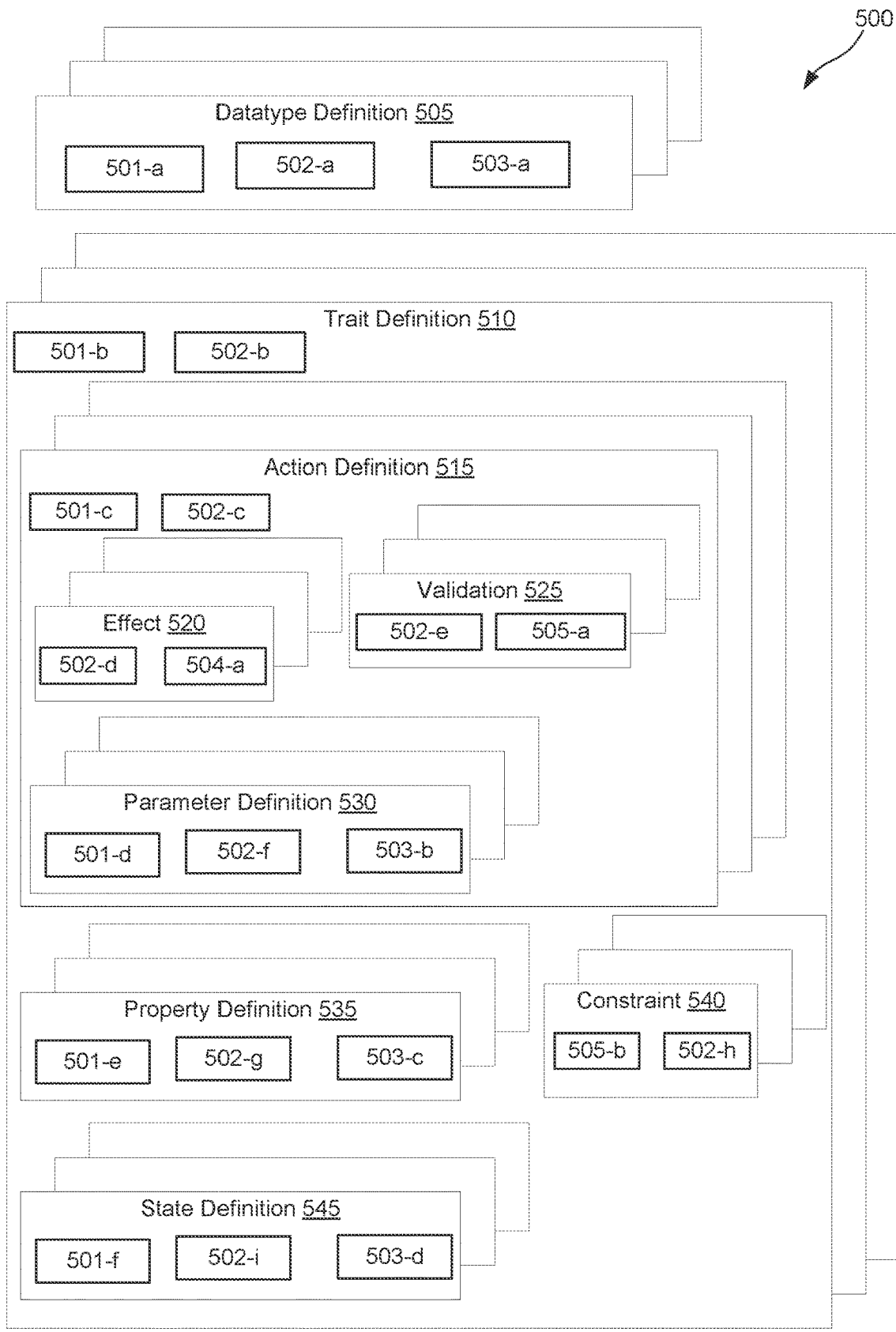
FIG. 5 illustrates an embodiment of various data entities in a traits catalog, according to various aspects of the disclosure.

For the purposes of this disclosure, a "trait catalog" or "trait library" may comprise one or more of trait definitions and datatype definitions, further described in relation to FIG. 5. Additionally, or alternatively, the trait catalog can capture all functionality and capabilities for a given traits implementation. For the purposes of this disclosure, "trait definitions" are declarative, static documents (data) that define the states, actions, properties, and other relevant information for a given trait. Thus, in some examples, the trait catalog may comprise a collection of trait definitions, in addition to any custom named datatype definitions.

For the purposes of this disclosure, traits may have multiple "instances" of a given trait. These instances can be independent and can be differentiated by an instance identifier string. An example use case of an IoT device implementing a trait having multiple trait instances may include a multi-port power strip with individually controllable outputs (or outlets). In one non-limiting example, the IoT device may have multiple instances of a "Power" trait, which provides the ability to individually switch an outlet On/Off. In this example, each instance of the Power trait is associated with a different one of the plurality of controllable outlets but referenced to the same multi-port power strip. In this way, rather than defining each outlet as its own logical device to the cloud, the use of multiple trait instances allows multiple sub-components (e.g., outlets of the power strip) of the IoT device, each sub-component implementing the same or similar trait, to be linked to the same physical device. Said another way, without the ability to describe multiple instances of the Power trait for the multi-port power strip, each outlet may be defined as its own logical device to the IoT cloud backend, preventing it from realizing that the outlets are part of the same physical device. In some examples, a trait may be associated with multiple trait configurations and multiple state fields. Further, an IoT device may have multiple traits, where each trait maintains its own set of state fields (e.g., reported state fields)

For the purposes of this disclosure, the term "host platform" refers to the computing platform/system that integrates the trait libraries or catalog into its own codebase (e.g., non-transitory computer readable storage medium storing instructions), for instance, to evaluate and assess traits associated with a connected device.

For the purposes of this disclosure, the term "action effect" may refer to modeling logic that is executed (e.g., by a processor) when an action is created, further described below in relation to FIG. 5. In other words, the host platform or controller comprises a non-transitory computer readable medium storing instructions (e.g., action effect 520) executable by a processor, which may be executed by the processor for computing a desired state (e.g., based on an action intent/request).

For the purposes of this disclosure, the term "desired state" is an estimated/calculated state change for a connected device, for example, in response to an action request received from an end user (via the UE). As noted above, the controller may intercept the action request transmitted by the UE before relaying it to the IoT device as an action intent (i.e., a validated and optionally modified version of the action request). Each of the action request and the action intent may be associated with a desired state, where the desired state (e.g., second desired state) associated with the action intent may be the same or different from the desired state (e.g., first desired state) associated with the action request. In some embodiments, the controller encodes the expected behavior of actions, as well as the one or more data interfaces to query the values of the one or more states associated with the connected device. In some instances, the state definitions in a trait are directly related to the data interfaces.

For the purposes of this disclosure, the term "action validation" refers to modeling logic that can be executed by a processor, e.g., before action effects are computed, in order to determine if an action (e.g., action request) is valid. In some examples, action validation (e.g., shown as action validation 525 in FIG. 5) comprises the host platform/controller evaluating the action request received from the end-user (e.g., via the UE or another computing device), while also considering one or more of a state snapshot (e.g., current or reported state for a trait of a connected device) and trait configuration(s) of the connected device.

For the purposes of this disclosure, the term "parsing" means checking an external or end-user or device provided payload (maybe an untyped payload) and asserting that it adheres to the one or more data contracts (e.g., property, state, or action definitions) outlined in the trait catalog/library. Parsing the payload may help ensure that the data fields and their corresponding values are valid (i.e., as expected for that payload). As an example, the host platform/controller may parse a user payload and determine that the data field "Power" is set to a value of "blue", when the only valid values for that data field are "On" and "Off".

For the purposes of this disclosure, "validation" not only includes parsing, but also asserting that any additional expectations (such as action validations or trait constraints) are maintained. In some cases, during validation, the host platform considers multiple payloads (e.g., trait configuration, state snapshot, action request or intent, and/or state value) at once. Furthermore, the validation may comprise evaluating the logical behavior encoded inside of traits via the modeling language (e.g., a scripting language with an object-based syntax that can be employed to embed logical expressions or programs into trait definitions 510). In some embodiments, the modeling language may be utilized to capture action validation 525 and/or action effects 520, as well as trait constraints 540.

FIG. 1 illustrates a block diagram depicting an example of a system 100 comprising a host platform 120, the host platform 120 implementing a traits engine 106, according to various aspects of the present disclosure. In this example, the host platform 120 utilizes information related to the traits for an IoT device 116 (i.e., connected device 116) to calculate a desired state for the connected device, for instance, based on receiving an instruction or command from a UE 102. In this embodiment, the host platform 120 comprises a traits engine 106 (also referred to as a calculator 106), a traits catalog 122, a transport layer/connector integration module 114 (also referred to as a connector 114), and a selector 111. In some examples, the host platform 120 is electronically, logistically, and/or communicatively coupled to a user equipment (UE) 102 and the IoT device 116 via a network or an internet connection. The UE 102 may be an example of a computing device, such as, but not limited to, a tablet, a smartphone, a laptop, and a NetBook.

In some cases, the host platform 120 is configured to store and operate on action intent 108, desired state 109, reported state 110, and properties 112 (e.g., device properties, trait configuration for the IoT device 116). Unlike traditional systems that pass user request(s) directly to the IoT device, the disclosed host platform 120 receives action requests 104 from the UE 102 in dataflow 101-*a*, which are then converted to action intents 108 (shown as dataflow 101-*b*). The action request 104 may include an indication of a first desired state. Further, the action intent 108 may also be associated with the first desired state. In some examples, the action intents 108 are used in the traits engine/calculator 106 along with one or more of the reported state 110 and properties 112 from the IoT device 116, and traits from the traits catalog 122, to calculate the desired state 109. This computed desired state 109 may be referred to as the second desired state. The second desired state may be the same or different from the first desired state.

As noted above, the traits catalog/library 122 comprises one or more of trait definitions (e.g., trait definitions 510 in FIG. 5) and datatype definitions (e.g., datatype definitions 505 in FIG. 5). Additionally, or alternatively, the trait catalog 122 may capture all functionality and capabilities for a given traits implementation. As described below in relation to FIG. 5, trait definitions are declarative, static documents (data) that define the states, actions, properties, and other relevant information for a given trait. Thus, the traits specific information in the trait catalog 122 may define the expected behaviors of the IoT device 116 in response to certain desired states 109. Thus, the desired state 109 (e.g., computed by the calculator or traits engine 106) is not only based on one or more action intents 108, the reported state 110, properties 112, and traits in the trait catalog 122, but also on a state 110 and/or properties 112 that are expected to be the result of a previous desired state 109. As an example, an action intent 108 to turn on a smart TV (e.g., IoT device 116), where the smart TV has a reported state 110 of "Off", may result in a desired state 109 of "turn on" the TV, which can be passed to the IoT device 116. In response, the smart TV may report an "On" state, which is the expected state calculated by the traits engine 106. However, if the reported state 110 comes back as "Off" despite a desired state 109 of "turn on" being passed to the TV, then the traits engine 106 may determine that there is an error/issue at the IoT device 116. For example, the traits engine 106 may evaluate the reported state 110 and determine there is a discrepancy between the state 110 expected (i.e., based on the trait definitions and the desired state 109 passed to the IoT device) and the state 110 actually reported by the IoT device. In such cases, if a subsequent user request includes another "turn on TV" instruction, the traits engine or calculator 106 refrains from retransmitting the desired state 109 to the smart TV. Instead, the host platform 120 transmits a message to the UE 102 indicating the error and the estimated state at the IoT device 116. This estimated state may correspond to a state estimated by the traits engine 106 based on the discrepancy between the desired state/expected state and the reported state. In other cases, the host platform 120 determines an error/issue at the IoT device based on identifying an absence of an error response, an updated state, or a reported state from the connected device. For instance, the host platform 120 may expect the smart TV to update its state when a desired state of "turn on" is passed to the smart TV. In the absence of any such state update, the host platform transmits a message to the UE, including an indication of the error and estimated state. For instance, the host platform 120 may relay the state 110 and properties 112 to a device queries module 134 in dataflows 101-*f* and 101-*g*, respectively. Further, the device queries module 134 may automatically (or in response to a query from the UE 102) relay a message including an indication of an error (if any), a state, and/or properties of the IoT device 116 in dataflow 101-*h*. The device queries module 134 may be embodied in hardware, software, or a combination thereof.

An IoT device 116 (e.g., an IoT lightbulb, IoT thermostat, robot vacuum, smart TV, wi-fi enabled refrigerator, z-wave garage door opener) may be configured to execute a physical change at any time (or at a pre-defined time) that causes a local event or action 118 to occur. For example, an IoT thermostat may be configured to change the setpoint temperature on a cycle (e.g., 8 am-5 pm, setpoint=20 degrees C., 5 pm-10 pm, setpoint=21 degrees C., and 10 pm-8 am, setpoint=18 degrees C.). In such cases, the IoT device may be configured to update its reported state 110 to reflect a change in local conditions or measurements. Additionally, or alternatively, the IoT device 116 may update its configuration properties 112 via a synchronization or "sync" event. In accordance with aspects of the present disclosure, when the IoT device 116 updates or reports its state 110 to the host platform 120 (shown as dataflow 101-d) or synchronizes its configuration with properties 112 on the host platform 120 (shown as dataflow 101-*e*), the traits engine 106 recalculates the desired state 109. In an example, a smart thermostat (e.g., NEST thermostat provided by ALPHABET, INC., of Mountain View, Calif.) may include a trait configuration that determines what mode(s) it supports. The modes are determined by how the thermostat is wired, and an end-user can remove the thermostat, rewire the connections, reattach the thermostat, and the thermostat would then re-announce its trait configuration (e.g., in dataflow 101-*e*) back to the host platform 120 to signal the change in functionality.

For the purposes of this disclosure, a host platform, such as host platform 120, may be embodied in hardware, software, or a combination thereof. In some cases, the host platform 120 comprises a software environment or execution context that the traits library (or traits catalog 122) is embedded in. An example method flow for the calculation and subsequent communication (optional) of the desired state 109 is described in relation to FIG. 4. While not necessary, in some examples, the traits engine 106 does not set the state 110, but instead, calculates the desired state 109 from one or more of the reported state 110, properties 112, and traits specific and expected behavior information for the IoT device 116 (e.g., retrieved from the traits catalog 122). Further, the traits engine 106 is configured to update the desired state 109, for instance, when the IoT device 116 causes a change to the state 110 and/or properties 112. So, the desired state 109 is not merely a function of state and other properties, but rather an expected behavior that aligns with the state 110 and any desired state 109 recently passed to the IoT device 116. For instance, if a desired state of "lock" was recently passed to the IoT device 116, and the reported state 110 comes back as unchanged, then the traits engine 106 may determine that the IoT device 116 (e.g., lock) is jammed. In some cases, the traits catalog 122 is encoded with this expected behavior. For example, the traits catalog may comprise a lookup table/function (or another applicable data structure) that provides a mapping of the expected behavior, reported state, properties, etc., of an IoT device when a desired state is passed to the IoT device 116. For instance, when a desired state of "A" is passed to the IoT device 116, the expected reported state is "A", the properties are "B", and the expected behavior is consistent with the "A" state and "B" properties. Alternatively, if a desired state 109 of "lock" is issued by the host platform 120, and the lock does not return any reported state 110 (changed or unchanged), then this behavior may indicate an issue with the network or interconnect connection with the IoT device 116. These are just some non-limiting examples of behaviors that can be stored in the trait catalog/library 122 and are in no way limiting of the plethora of behaviors contemplated in different embodiments. As another example, the traits catalog 122 can be coded to have the behavioral expectation for a power device or IoT light bulb, that when a desired state 109 of "power on" is passed to it, the next reported state 110 should be "power on." If a different reported state 110 results, then the traits catalog 122 may be coded with logic to address these unexpected behaviors (or anomalies) and a different desired state 109 may be passed as a result of this unexpected behavior.

Figure 4:
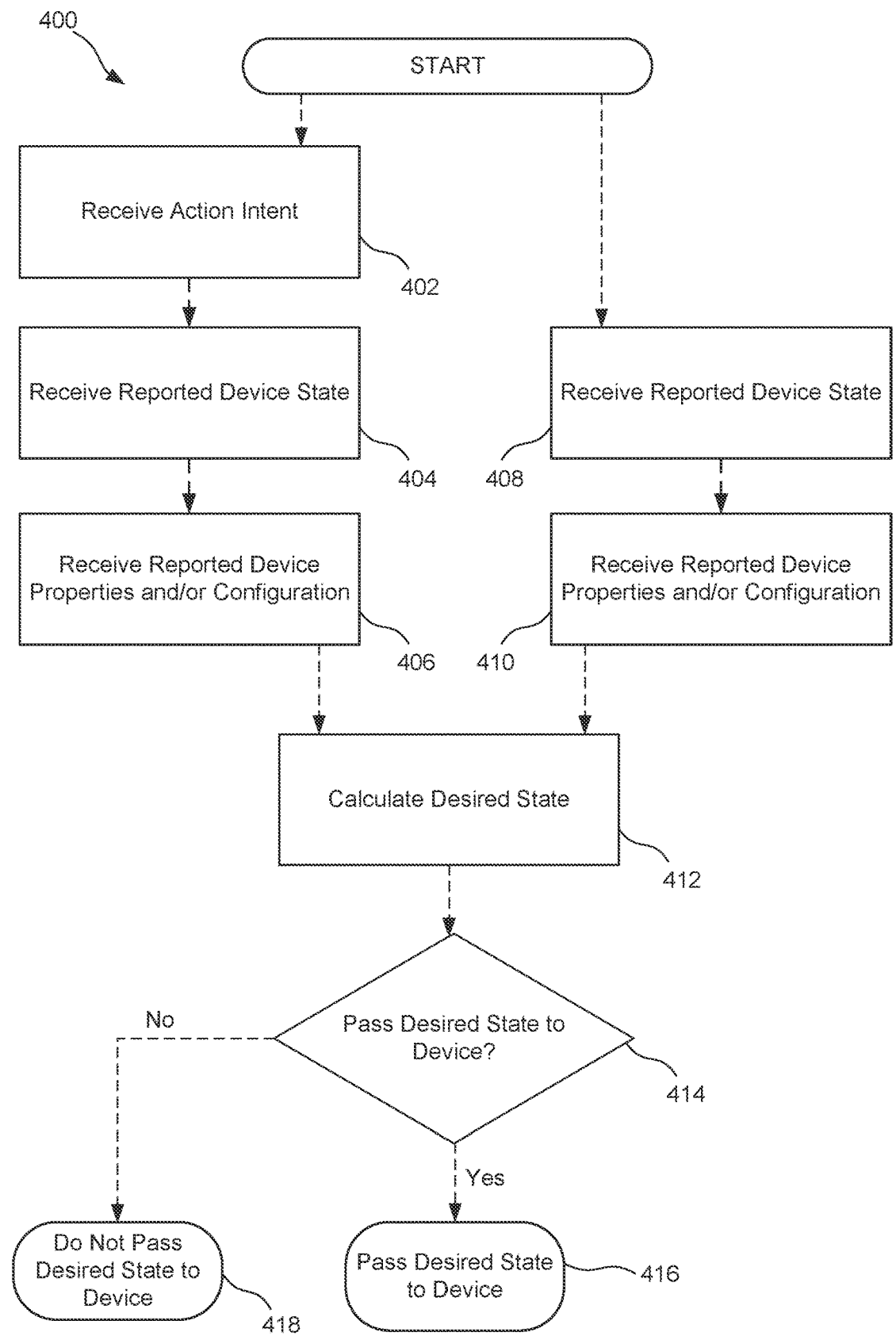
FIG. 4 illustrates an example of a method for communicating with a connected device, such as an Internet of Things (IoT) device, in accordance with various aspects of the disclosure.

The desired state 109 may also be a function of any action intent 108, though there may not always be a current action intent 108 (e.g., a timeout threshold since a previous action request 104 may have been exceeded). FIG. 4 shows an example flow for calculating a desired state 109 based in part on action intents 108 in steps 402, 404, 406, and 412. In some embodiments, the desired state 109 can be passed to the IoT device 116 whenever the desired state 109 is updated. Alternatively, a selector module 111 in a transport layer/connector integration module 114 (also referred to as connector module 114) can determine when to pass an update of the desired state 109 to the IoT device 116. In some examples, the connector module 114 may also pass an indicator of an action (e.g., action request 104) associated with the desired state 109 and/or a change in the desired state 109 to the IoT device 116. Upon receiving one or more of the action intent 108 and the desired state 109 (e.g., in dataflow 101-c), the IoT device 116 may attempt to alter its state in response to the action intent 108 or desired state 109. As an example, an IoT door lock in the "locked state" may receive a request to modify its desired state to the "unlocked" state, but due to physical impediments (e.g., lock is jammed), may not be able to change state. In another example, an IoT door lock in the "locked" state may receive a request to modify its desired state from an "unlocked" state to the "locked" state. In this case, the host platform 120 may assess the reported state 110 (i.e., the locked state previously reported by the IoT door lock) and determine that the reported state 110 is the same as the desired state 109, in which case it refrains from transmitting the desired state 109 and/or the action intent 108 to the IoT device.

In other situations, an end-user (e.g., associated with UE 102) creates an action request 104 (e.g., increase brightness of an IoT lightbulb) that is relayed to the IoT device 116. Whereas, in the prior art, that action request would be directly transmitted to the IoT device 116 and stack up in a queue of other action requests, in the embodiments of this disclosure, the action request 104 first goes to the traits engine 106 in the host platform 120. Further, the traits engine 106 parses and/or validates the action request 104 to generate an action intent 108, which is a form of the action request 104 more likely to fit within a traits framework. In some cases, one or more of the action request 104 and/or the action intent 108 are associated with a first desired state. After forming the action intent 108, the traits engine 106 computes the desired state 109. While not necessary, the desired state 109 (also referred to as second desired state) may be similar or substantially similar to the desired state associated with the action intent 108 or action request 104. For instance, when a user transmits an instruction/command to turn "ON" an IoT device 116 in the "OFF" state (i.e., reported state 110 is off), the desired state associated with the action request 104, action intent 108, and the desired state 109 may all be the same. In some cases, the desired state 109 calculated by the traits engine 106 may be different from the desired state associated with the action request 104, for instance, when the desired state for the action request is incompatible with the trait properties, configuration properties, current state or reported state, etc., for the IoT device.

In some cases, different IoT devices 116 manufactured by different suppliers may accept instructions/commands in different formats (e.g., use different syntax, data fields, data structures, etc.). Said another way, the desired state 109 calculated by the traits engine 106 may not always be presented in a form that is readable by the IoT device 116, as device manufacturers often use proprietary or custom coding languages, scripts, formats, etc., in their IoT devices. To alleviate this issue, aspects of the disclosure provide a connector 114, where the connector 114 is configured to encode the desired state 109 in a form that can be directly communicated/issued to the device 116 as a command. In one non-limiting example, the connector module 114 interacts with a software development kit (SDK) of the IoT device 116 vendor to send commands (e.g., desired state 109, action intent 108) to the IoT device 116.

A device's desired state 109 can be a function of all queued action intents 108 it has yet to process, as well as its current/reported state 110 and properties 112. The host platform 120 provides this information to the traits engine/calculator 106 in order to compute the desired state 109. In some embodiments, the logic that drives the computation of the desired state 109 is fully captured inside the trait definitions in the traits catalog 122 (e.g., via the modeling language). In an embodiment, the traits engine 106 passes both the desired state 109 and one or more action intents 108 to the selector 111, which can then decide which of these to pass to the device 116. The selector 111 is a component of the host platform 120 that constructs a data transport object for relaying the traits-generated information across the system 100, where the data transport object is constructed based at least in part on determining the needs of the downstream IoT device 116 (e.g., devices, adapters, connectors). In one non-limiting example, the host platform 120 may pass or describe a trait's data over Hypertext Transfer Protocol Secure (HTTPS) with JavaScript Object Notation (JSON) objects, however the IoT device 116 may use a different protocol and encoding for data comprising a combination of MQ Telemetry Transport Secure (MQTTS) with Concise Binary Object Representation (CBOR). In such cases, the connector 114 allows for the translation between the communication protocol utilized by the host platform (i.e., HTTPS and JSON) and the native communication protocol utilized by the IoT device 116. It should be noted that, the communication protocols (e.g., HTTPS, MQTTS) and the data formats (e.g., JSON, CBOR) discussed above are exemplary only, and not intended to be limiting. Other types of communication protocols and data interchange/serialization formats known in the art are contemplated in different embodiments.

In some instances, connected devices may be configured to "trust" the cloud to set its state 110 to the computed desired state 109. For instance, a connected device may implement handling logic for each action, or simply trust the desired state value 109 received from the cloud. But some actions may only be "resolvable" at the physical device level. For instance, a trait for an IoT door lock may dictate that a passcode for unlocking the IoT door lock is only verifiable on-device (e.g., for security reasons). In this example, the device 116 may receive the passcode along with an "unlock with passcode" action intent 108. Further, the device 116 may locally process the action intent 108 (i.e., instead of being processed in the cloud) by checking the passcode and unlocking if the passcode is valid. Here, there is no computation of the desired state 109 since the device 116 needs to directly process the action intent 108.

It should be noted that, not all actions always result in a state change at the IoT device 116. As an example, an IoT device 116, such as a connected doorbell, may be configured to generate a sound (e.g., action=sound doorbell chime) when pressed and optionally display a message on a user's computing device indicating that someone just rang the bell. In this example, as well, no desired state 109 may need to be computed since there is no state change at the IoT device.

As discussed above, the device state 110 may not be set directly by the platform 120. Further, the connected IoT device 116 may be configured to report state changes back to the host platform 120. However, several (if not most) actions are associated with an expected change in state 110, where ideally, the change should occur when the IoT device 116 receives a desired state 109. For example, a Power "On-Off" action intent 108 should result in the device's 116 power state being set to the power parameter (e.g., On or Off) corresponding to the action. This behavioral expectation is directly encoded within the trait catalog 122, the same way that the schema for the data interfaces of states and properties are. In some examples, the states, properties, etc., and their datatypes are defined in the trait catalog 122. Further, these definitions are reflected in the application programming interfaces (APIs) to query the values of those states/properties. As an example, a connected device may implement a state for "isPoweredOn". In this cases, the host platform 120 may allow the user to query the value (e.g., Yes or No, 1 or 0, True or False, to name a few non-limiting examples) for the state "isPoweredOn". In some aspects, the definitions may themselves serve as the APIs. This helps the integration layer 114 of the platform 120 understand what happens when an action is executed. In one non-limiting example, the connector 114 may directly react to the action intent 108, for instance, by relaying it to the device 116. Alternatively, the connector 114 may rely on the desired state 109 computed by the platform. Such a design serves to simplify connector authoring and/or potentially allows the host platform 120 to enable functionality not provided by the third party (e.g., device vendor). In some aspects, connector authoring refers to a technique (maybe implemented by the connector 114) for translating between the traits language (e.g., HTTPS and JSON) used by the host platform 120 to the native language (e.g., MQTTS and CBOR) understood by the IoT device. In some examples, connector authoring may also be referred to as connector development.

Figure 2:
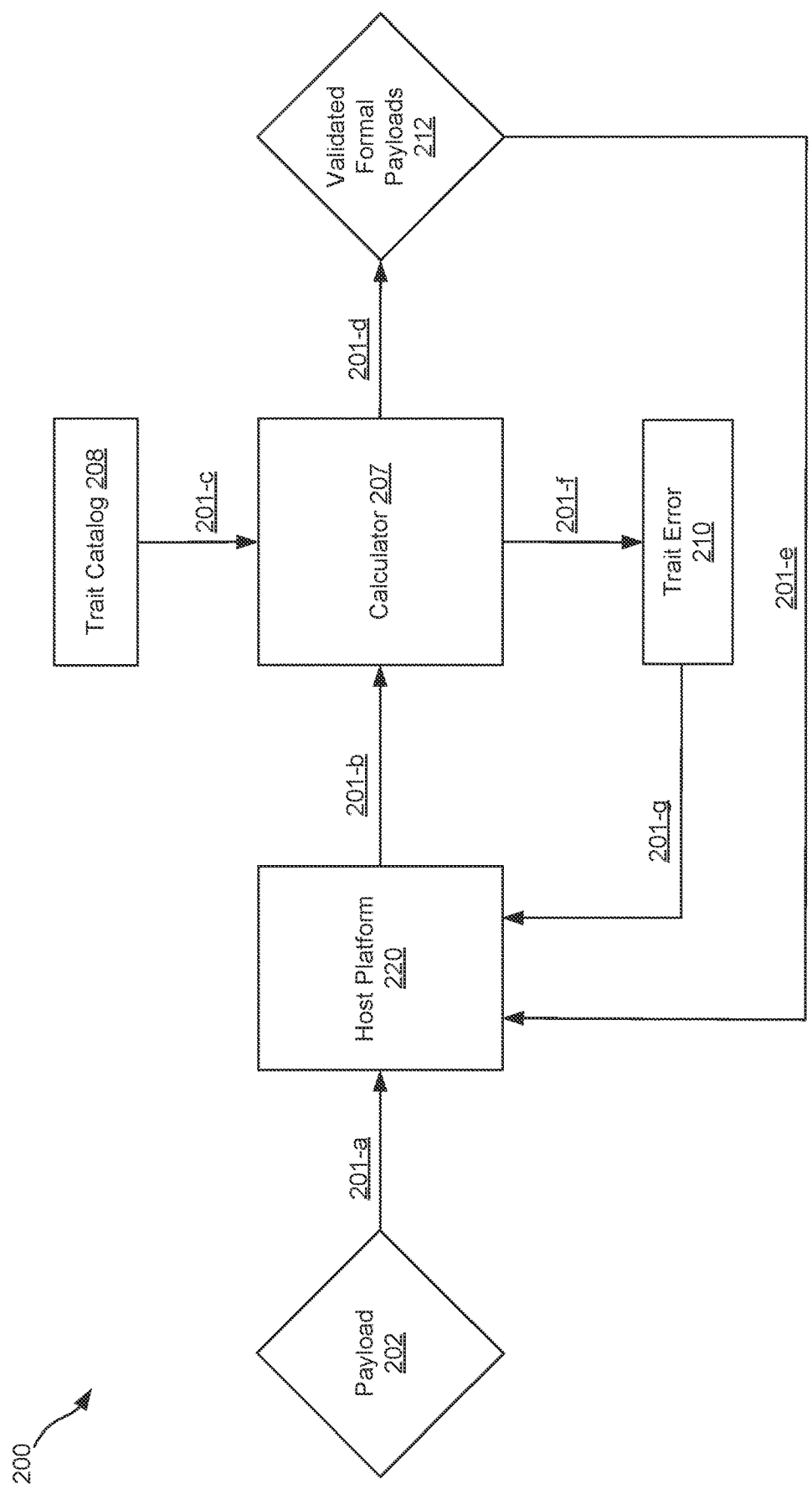
FIG. 2 illustrates an example of a method for validating action intents, in accordance with various aspects of the disclosure.

FIG. 2 illustrates an example of a method 200 for validating action intents, according to various aspects of the disclosure. The operations of method 200 presented below is intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

As seen, at step 201-a, the host platform 220 receives a payload 202, where the payload 202 is associated with a trait configuration, state snapshot, action intent, and/or state value, to name a few non-limiting examples. In some cases, the payload 202 may also be referred to as trait-based payload. In some cases, the incoming payload 202 may be validated against the trait catalog 208 to ensure that there are no errors in values, structure, datatypes, and fields in the payload 202. For example, the incoming payload 202 may be parsed to ensure that it has the correct fields and datatypes. Typically, parsing is the simplest trait operation as it involves a single payload and can be performed relatively quickly. According to aspects of the disclosure, the payload 202 can also be validated, where validation goes a step beyond parsing. Validation of the payload 202 may be used to assert that any logical validations or constraints encoded within traits are maintained. In some examples, validating payloads may involve checking that a pending state update is valid as a function of the properties (shown as properties 112 in FIG. 1). In some aspects, validation helps constrain the data contracts (e.g., property, state, action definitions) and expectations of the connected devices managed.

In some cases, the host platform 220 receives the data corresponding to the payload 202 through its APIs (e.g., public APIs). Furthermore, after the host platform 220 receives the incoming payload 202 (e.g., trait configuration or a state snapshot), it proceeds to re-package the data into a formal payload that can be understood/processed by the calculator 207. The host platform 220 forwards the formal payload to the calculator 207 at step 201-b. In some cases, the calculator 207 (maybe similar or substantially similar to the traits engine 106 in FIG. 1) attempts to validate this formal payload by sourcing information from the trait catalog 208, where the information may be sourced at runtime. If validation is not passed, the calculator 207 outputs a trait error 210, which is relayed to the host platform 220 (steps 201-f and 201-g). Alternatively, if validation passes, the calculator 207 computes a validated formal payload 212 that is relayed to the host platform 220 (steps 201-d and 201-e).

In some aspects, formal payloads give a common set of terms and data interface expectations that can be used to communicate or "speak" traits. Some non-limiting examples of formal payloads include a trait configuration, a state snapshot, an action intent, and/or state value. In some cases, the trait configuration may combine the entire payload of the trait's properties and the trait name. The connected device may provide one or more trait configuration(s) for traits it implements while synchronizing itself to the host platform

220. In some aspects, the collection of trait configuration payloads for traits a device implements fully qualify its functionality and capabilities. In one non-limiting example, the trait configuration for the "Power" trait of an IoT device may be represented as:

{trait: "Power", properties: {supportsToggle: false,
    supportsDiscreteOnOff: true} }

In some cases, a state snapshot comprises a trait state for a given trait instance and the trait name. In some cases, an IoT or connected device may update one state field for a trait at a time. In other cases, the connected device may update all its state fields for the trait at the same time (e.g., if the entire state snapshot is needed for validation). As used herein, the term "partial state snapshot" refers to a state snapshot having one or more missing fields. It should be noted that, an IoT device may be associated with multiple traits. Further, a trait may have multiple trait configurations and/or multiple state fields, in some examples. In one non-limiting example, the state snapshot for a "Lock/Unlock" trait for an IoT device may be represented as:

{trait: "LockUnlock", state: {isLocked: true,
    isJammed: false} }

An action intent (e.g., action intent 108 in FIG. 1) comprises a qualified action name (i.e., trait name+action name) along with one or more parameters associated with that given action. These parameters may be described within the trait definitions in the trait catalog and provided at runtime. Typically, an action intent is associated with an action request (e.g., action request 104) in the host platform, that represents an end user's action targeting a connected device. In some cases, one or more data fields, such as, device ID and/or timestamps may not be included as part of the action intent or considered a part of "traits". For instance, one or more of the device ID and timestamps may instead be dictated by the host platform 220. In one non-limiting example, the action intent for a "Lock/Unlock" trait for an IoT device (e.g., automatic door lock) may be represented as:

{action: "LockUnlock.lockUnlock", parameters:
    {lock: true} }

In some embodiments, a state value comprises a qualified state name (e.g., trait name+state name) and the value for that trait state. In some cases, the state value may be included within the payload (e.g., payload 202) provided by connected devices, for instance, when updating their state with the host platform. In one non-limiting example, the state value for a trait state for an IoT door lock may be represented as:

{state: "LockUnlock.isLocked", value: true}

In addition to the parsing of action requests, additional validation logic can be utilized to factor in action request payloads, state (e.g., device state, state snapshot, partial state snapshot, state values), and device properties. In some cases, this logic is captured via the modeling language syntax inside the validation definitions (e.g., shown as validation 525 in FIG. 5) of the action definition (e.g., shown as action definition 515). Additionally, or alternatively, trait properties may be used to qualify or constrain the ways an action (e.g., action intent) can be used and action validations enable such these checks to be implemented.

Furthermore, in addition to the parsing of state snapshots or trait configuration payloads, additional validation logic can also be utilized to factor in either the current state snapshot, the current device properties, or both. In some examples, the current state snapshot and/or the current device properties may be considered "constraints" and defined via the modeling language syntax inside trait definitions (e.g., trait definitions 510 in FIG. 5). In some cases, constraints may facilitate in providing more control over how properties or state can be modeled. Beyond the schema definitions described by datatypes, constraints may allow another set of relationships and/or validation to be added by a trait's configuration and/or state values. As an example, a trait definition may describe all possible operation modes for IoT fans, namely, ON, OFF, and OSCILATING. However, a trait instance for an IoT fan may only support the ON and OFF modes, where the information pertaining to the supported modes may be provided by the IoT fan's current configured trait properties. In this example, a constraint may that while all three operating modes (ON, OFF, and OSCILATING) can be understood/processed, only two of those modes (ON, OFF) are valid for the specific IoT fan.

Figure 3:
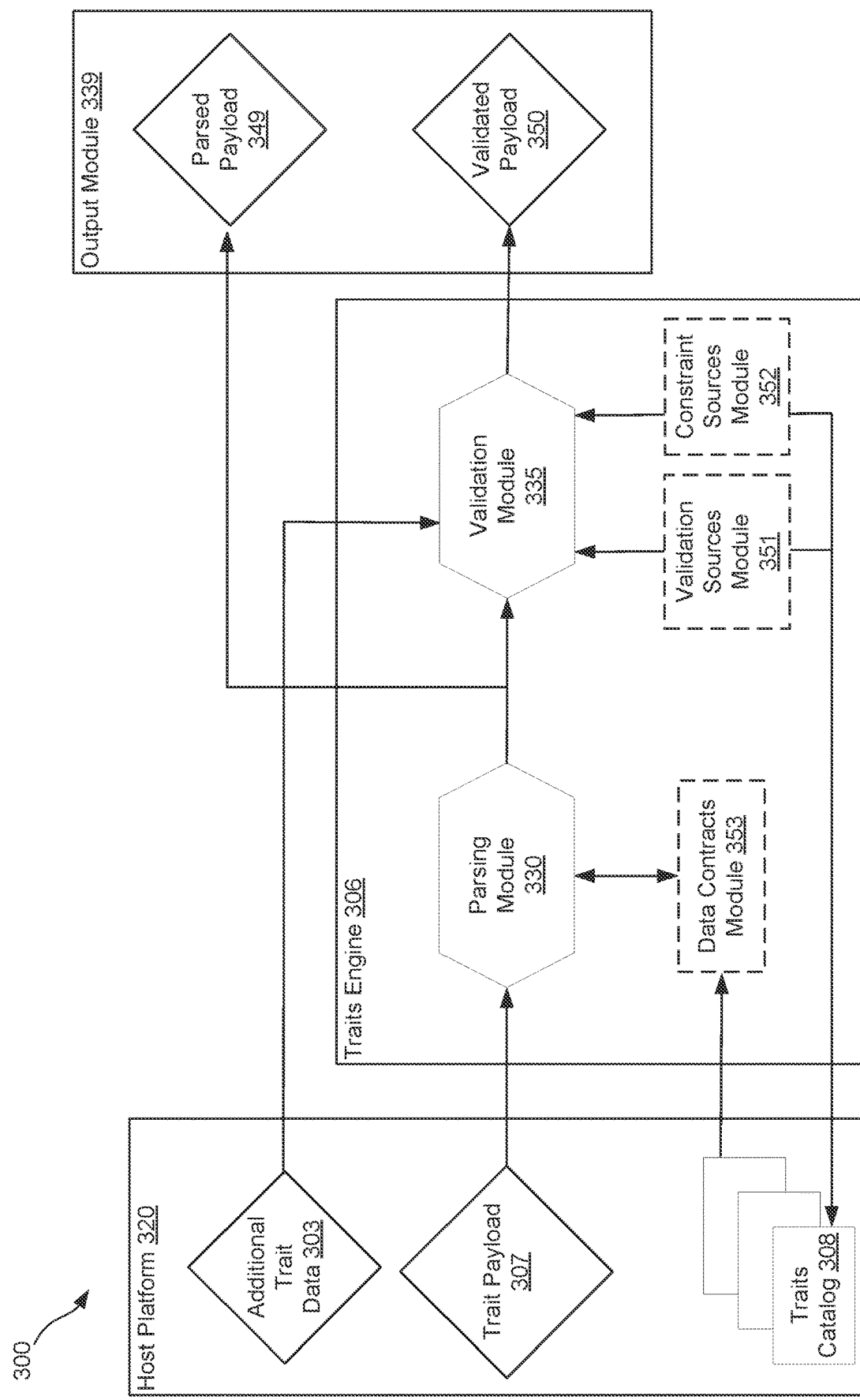
FIG. 3 illustrates an example of a method of parsing and validating action intents, in accordance with various aspects of the disclosure.

FIG. 3 illustrates an example of a process flow 300 for parsing and validating action intents, according to various aspects of the disclosure. The operations of process flow 300 presented below are intended to be illustrative. In some implementations, process flow 300 may be accomplished with one or more additional operations not described, and/or without one or more of the operations discussed. Additionally, the order in which the operations of process flow 300 are illustrated in FIG. 3 and described below is not intended to be limiting.

In some implementations, the operations of process flow 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process flow 300 in response to instructions stored electronically on an electronic storage medium. The one or more processing devices may include one or more devices configured through hardware, firmware, and/or software to be specifically designed for execution of one or more of the operations of process flow 300.

In some cases, the host platform 320, which may be similar or substantially similar to the host platform(s) 120, 220, provides one or more inputs that are received by the traits engine 306. For example, the host platform 320 may provide a traits payload 307 (such as a trait configuration or state snapshot for a specific trait instance) to the parsing module 330 of the traits engine 306. Further, a data contracts module 353 may source the data contracts (e.g., property, state, or action definitions) from the traits catalog 308 of the host platform 320. The parsing module 330 may be at least one of electronically, logistically, and communicatively coupled to the data contracts module 353. In some cases, the traits engine 306 may also comprise a validation module 335 that optionally receives additional trait data 303 (e.g., data from another independent, yet related, trait instance's configuration or state snapshot) from the host platform 320. The validation module 335 may source trait constraints and action validations (e.g., in the form of logical modeling language) from the trait catalog 308 via the constraint sources module 352 and the validation sources module 351, respectively. One or more of the validation sources module 351, the data contracts module 353, and the constraint sources module 352 may be optional (shown as optional by the dashed lines). In some cases, the parsing module 330 and the validation module 335 directly source the data contracts, action validation expressions, and/or the trait constraints expressions from the traits catalog 308.

After parsing the traits payload 307, the parsing module 330 outputs a parsed payload 349, where the parsed payload is stored in/received by an output module 339. Furthermore, the validation module 335 also outputs a validated payload 350 (e.g., also shown as validated formal payload 212 in FIG. 2) that is received by the outputs module 339.

In some cases, validation sources may include the data contract(s) defined by the trait catalog. Additionally, or alternatively, the validation source(s) may be related to the data within the trait state (e.g., last known reported state). In some examples, the traits engine/calculator or the IoT cloud backend may comprise a state machine, which imposes limits on the state that can be reported by the IoT device. These limits on the new reported state may be based on the previously known state for the IoT device. As an example, the state machine could be aware that the last reported state for an IoT door lock was the "jammed" state. Here, the state machine may impose limits on any additional inbound data from the connected device before the state for the connected device can be updated. For instance, the state machine may require the connected device to first announce that its state is "unjammed" before a locked/unlocked state can be updated.

One non-limiting example of a trait constraint may be that the length of a PIN code (e.g., for IoT passcode enabled door lock) can only be between 4-6 characters long, or only 100 PIN codes can be stored on the door lock. These constraints are the values provided to the trait configuration property. In this example, the data fields for the trait configuration property (e.g., maximum PIN codes) may be represented as: {Config property field=Max PIN codes; Config property value for Max PIN codes=100}.

FIG. 4 illustrates an example of a method 400 for communicating with a connected device, such as an Internet of Things (IoT) device, in accordance with various aspects of the disclosure. Specifically, but without limitation, the method described in relation to FIG. 4 shows one example of the logic used to calculate the desired state (e.g., desired state 109 in FIG. 1) and pass/not pass the desired state to the connected device.

The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, the operations of method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At step 402, the method comprises receiving an action intent (or an action request from a user's computing device). For example, the action intent may be received by the traits engine/calculator 106 of the host platform 120 in FIG. 1.

Alternatively, the host platform 120 receives the action request 104 from the UE 102, converts it into the action intent 108, and forwards it to the traits engine/calculator. At step 404, the method 400 comprises receiving a reported device state from the connected device. At step 406, the method comprises receiving one or more of device properties and configurations (e.g., device configuration, trait configurations), where the device properties and configurations may be received from the connected device.

In some other cases, no action intent may be received. In such cases, the host platform or the traits engine/calculator receives the reported device state from the connected device (step 408). Further, at step 410, the traits engine/calculator receives the device properties and configurations (e.g., device configuration, trait configurations) reported by the connected device.

In either case, at step 412, the method comprises calculating a desired state for the connected device, as previously described in relation to FIG. 1. Further, at step 414, the host platform 120 (or the selector 111) determines whether to pass the desired state to the connected device. If yes, at step 416, the desired state (e.g., desired state 109 in FIG. 1) is passed to the connected device. If no, at step 418, the host platform refrains from passing the desired state to the device. In some examples, the host platform may optionally store this computed desired state to memory, i.e., even though the desired state was not passed to the IoT device.

FIG. 5 illustrates an embodiment of a traits catalog 500, as well as some examples of data entities and how they relate to each other in the traits catalog, according to various aspects of the disclosure. The traits catalog 500 may implement one or more aspects of the traits catalog 122, previously described in relation to FIG. 1. As seen, the traits catalog 500 comprises a plurality of definitions (e.g., datatype definition 505, trait definition 510, action definition 515, parameter definition 530, property definition 535, and state definition 545). In some cases, these definitions are data oriented, portable entities that can be encoded/transmitted as JSON or YAML, to name two non-limiting examples. These definitions may be used to express the data interfaces/contracts and data field names for the various parts of a trait (e.g., trait configuration, state, properties, constraints, actions). In some embodiments, the traits catalog 500 utilizes imperative logic, where the logic may be encoded in the object-based syntax of a modeling language.

In some examples, datatype definition 505 may comprise data-oriented JSON-encodable documents that define datatypes that can be re-used in various trait definitions. In some cases, traits may be used to capture various data interfaces, or contracts, by expressing what datatypes are expected in various payloads. Some non-limiting examples of datatypes include int, float, and string. Other custom-defined datatypes, such as "enum" or object-based datatypes, are also contemplated in different embodiments. In this example, each datatype definition 505 includes information pertaining to a datatype name 501-*a*, a datatype description 502-*a*, and a datatype 503-*a*. For example, to describe the datatype of the enumeration of possible thermostat operation modes, the datatype name 501-*a* may include "Thermostat Mode" and the datatype 503-*a* may comprise a list of values, such as, "Off", "Heat", "Cool", and "Auto". This may be represented as:

{datatypename=ThermostatMode; datatype=enum
 [OFF, HEAT, COOL, AUTO] }

Further, the trait definitions 510 may include data-oriented and JSON-encodable structures that are read by the traits engine/calculator at runtime. In some cases, a trait definition 510 may be used to define data interfaces, meta information (e.g., metadata about the trait, such as a human readable description of the intended behavior of the trait), logical constraints and effects associated with a given trait. As seen, each trait definition includes a name 501-b and a description 502-b. The trait definition 510 also defines the action definition 515, where the action definition 515 comprises a name 501-c and a description 502-c. Further, the action definition 515 comprises the effect 520 and the validation 525 specific information for actions. As seen, each effect 520 includes a description 502-d and a program 504-a (e.g., modeling language expressions or statements) for said effect in the action definition. Similarly, the validations 525 include a description 502-e and an expression 505-a (e.g., modeling language expression) for each action validation. In some cases, the action effect 520 comprises modeling logic that is executed when an action that can produce side effects is created. In some cases, the action effect 520 is used to compute the desired state resulting from an action. Furthermore, the action validation 525 comprises modeling logic that may be executed (e.g., before action effects are computed) for determining whether an action is valid. In some examples, one or more of the state snapshot and trait configuration may be considered while evaluating if an action is valid. The action definition 515 further comprises a parameter definition 530, each parameter definition including a name 501-d, a description 502-f, and a datatype 503-b.

In some cases, the trait definition 510 further comprises property definitions 535, each property definition comprising a name 501-e, a description 502-g, and a datatype 503-c. Additionally, or alternatively, each trait definition 510 comprises one or more state definitions 545, where each state definition comprises a name 501-f, a description 502-i, and a datatype 503-d. In addition to the action, parameter, property, and state definitions, the trait definitions 510 may also include information related to trait constraints 540. In some cases, each trait constraint 540 comprises a description 502-h and an expression 505-b, e.g., modeling language expression or statement. In other words, each of the one or more trait constraints 540 include modeling logic for asserting whether various data modeling constraints are held. In some examples, trait constraints 540 may be used to describe if a trait's state is within the boundaries set by a trait property. As an example, a trait property may list the available operation modes (e.g., ON, OFF) for a connected device, such as an IoT fan. In such cases, the trait constraints 540 may be imposed (or applied) on the trait's state to be within the list of the properties configured for that trait instance. For instance, the trait constraints 540 may help prevent the state of the IoT fan from being set to a third (unsupported) operation mode, such as, OSCILLATING. In some cases, the modeling logic in the trait constraint(s) may be executed when the device state or properties are updated. Further, the modeling logic in the trait constraints 540 may account for the properties, or state, or both.

As used herein, the term "modeling language" may refer to a scripting language with an object-based syntax that can be used to embed logical expressions or programs into trait definitions 510. This allows the action validations 525 and effects 520, as well as trait constraints 540, to be captured.

Figure 7:
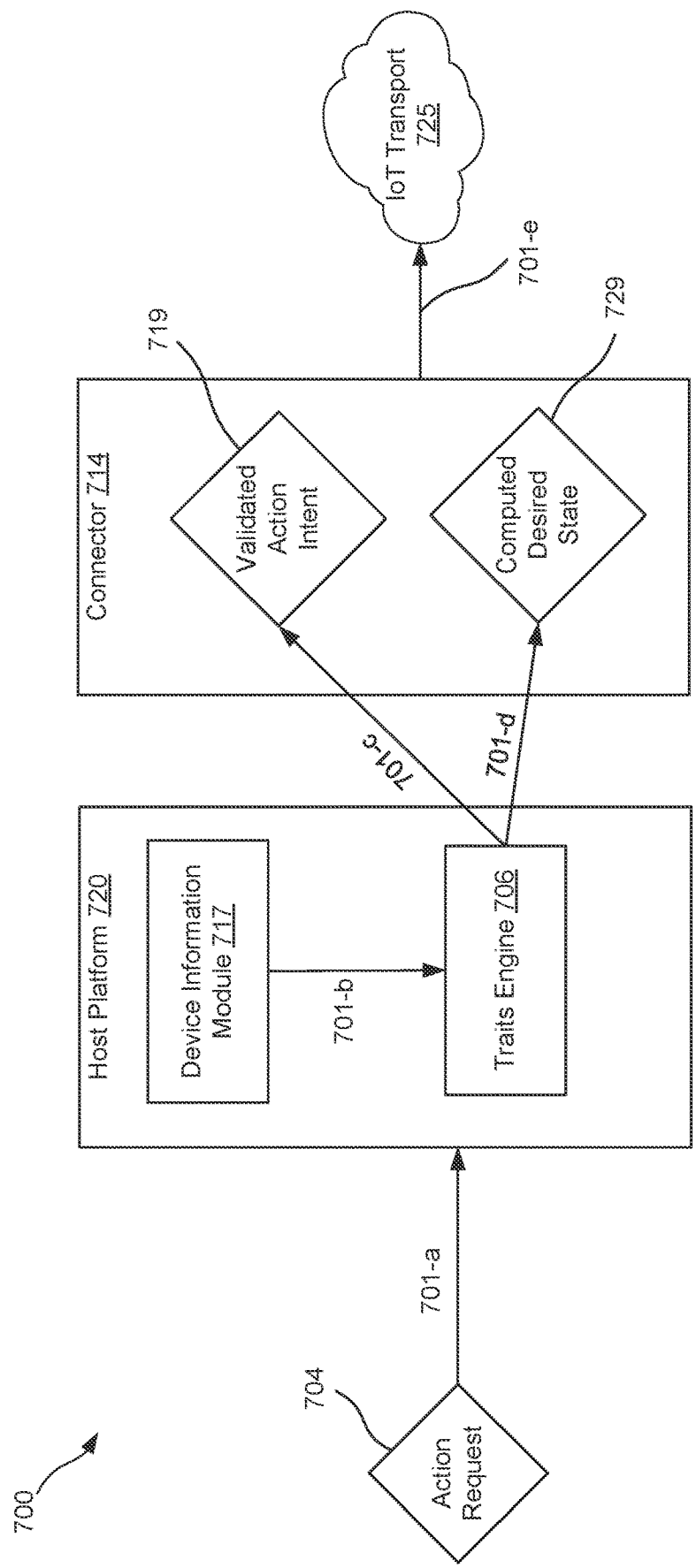
FIG. 7 illustrates another example of a method flow for communicating with a connected device, in accordance with various aspects of the disclosure.

FIG. 7 illustrates another example of a method 700 for communicating with a connected device, in accordance with various aspects of the disclosure. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

The method 700 comprises receiving an action request 704 from a user device associated with an end-user (step 701-a). In some cases, the action request 704 corresponds to a first desired state of the IoT device. The host platform 720 receives the action request at step 701-a and optionally generates an action intent from the action request. As noted above, an action intent corresponds to the functionality that the end-user is wishing to perform on the device, such as, turn power on, change color/brightness of IoT light bulb, change heat/cool setpoint on IoT thermostat, to etc. The mechanism to fulfill that action intent is for the end-user to submit an action request. In some cases, the host platform 720 validates the action request, where the validating comprises assessing the action request with respect to the trait configuration for the IoT device. In some cases, generating the action intent is based at least in part on validating the action request.

At step 701-b, the traits engine 706 (or calculator 706) receives persisted device information from a device information module 717 of the host platform. Some non-limiting examples of the persisted device information include a previously reported state, device configuration information, and/or trait configuration information. The traits engine 706 may validate the action request and provide the validated action intent 719 to the connector 714 at step 701-c. Additionally, the traits engine/calculator 706 also computes a second desired state 729 and relays this information to the connector 714 at step 701-d. In some cases, the second desired state for the IoT device may be calculated based on one or more of the action request, the trait configuration for the IoT device, the persisted device information (e.g., last known reported state received from the IoT device, a pre-existing estimated state), and new inbound action requests. The second desired state may correspond to the expected change in the IoT device's state in response to the action request. Once the connector 714 receives the validated action intent 719 corresponding to the first desired state, and the computed desired state 729 corresponding to the second desired state, it determines which of those (if any) to forward to IoT transport 725. In one non-limiting example, the IoT transport 725 may comprise a $3^{rd}$ party vendor application programming interface (API) used for communicating with the IoT device (e.g., shown as IoT device 116 in FIG. 1). In other cases, the IoT transport may comprise the IoT device.

While not necessary, in some examples, the first desired state may be the same as or substantially similar to the second desired state. At step 701-e, the method 700 comprises communicating the validated action intent 719, or the computed desired state 729 to the IoT transport 725, where the communicating comprises making an API call to the $3^{rd}$ party vendor API. In other cases, the connector 714 utilizes a vendor software development kit (SDK) to communicate with the IoT device.

Thus, by combining the device interfaces and desired/reported states, aspects of the present disclosure enable additional logic related to IoT device behavior to be layered in. In this way, the present disclosure helps predict an IoT device's behavior and/or model what an IoT device can do given its reported state. In some aspects, the present disclosure may facilitate in enhancing IoT device battery life, allow smaller batteries and/or smaller device cache/memory to be designed into IoT devices, and/or optimize computational processing at IoT devices.

Figure 6:
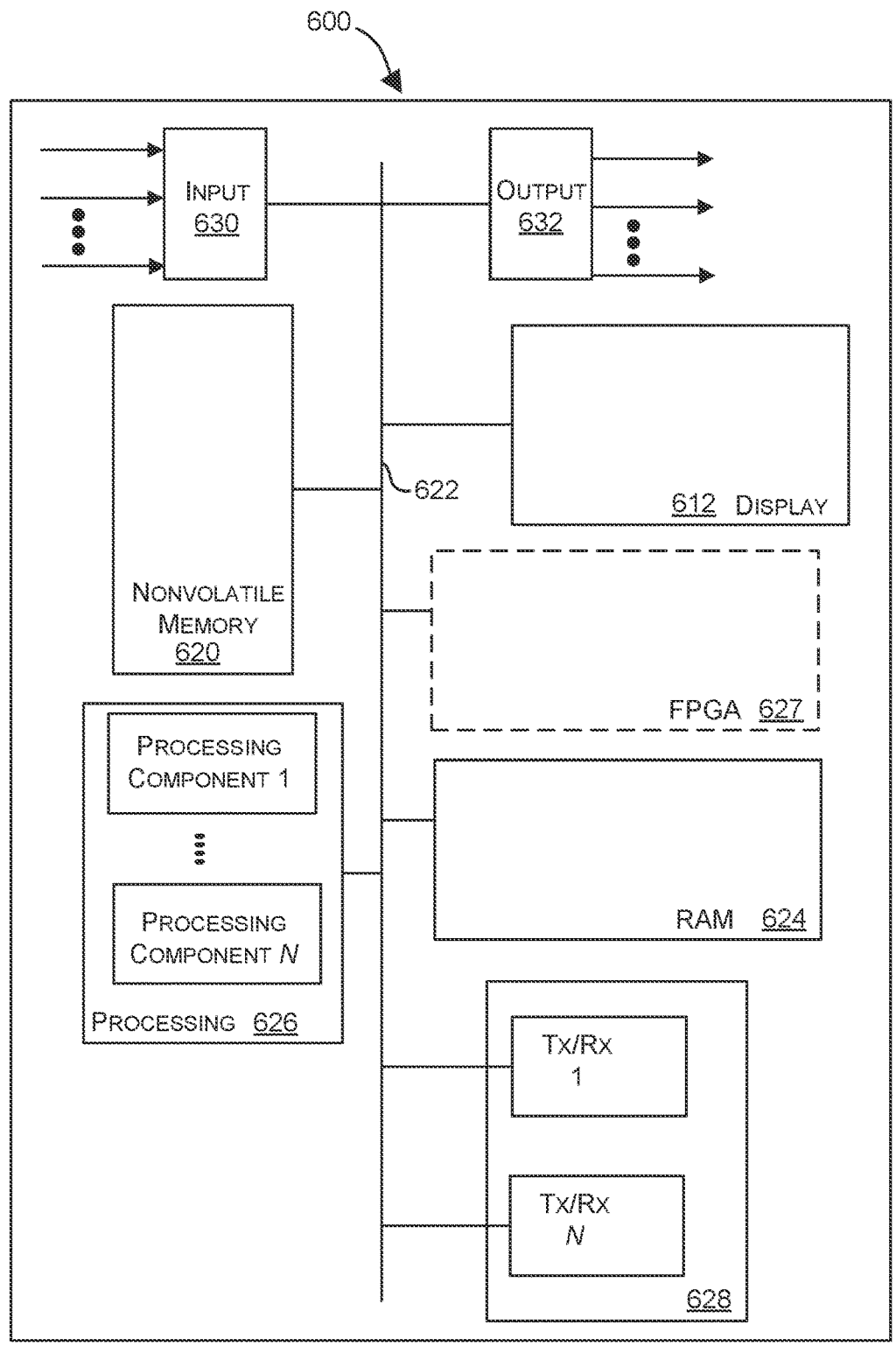
FIG. 6 is a block diagram depicting physical components that may be utilized to realize a device running the host platform and/or a device running the calculator in FIGS. 1 and 2, in accordance with various aspects of the disclosure.

The methods 200, 300, 400, and/or 700 described in connection with the embodiments disclosed herein may be embodied directly in hardware, in processor-executable code encoded in a non-transitory tangible processor readable storage medium, or in a combination of the two. Referring to FIG. 6 for example, shown is a block diagram depicting physical components that may be utilized to realize a device running the host platform 120 and 220 and/or a device running the traits engine 106 and calculator 207 according to an exemplary embodiment. As shown, in this embodiment a display portion 612 and nonvolatile memory 620 are coupled to a bus 622 that is also coupled to random access memory ("RAM") 624, a processing portion (which includes N processing components) 626, an optional field programmable gate array (FPGA) 627, and a transceiver component 628 that includes N transceivers. Although the components depicted in FIG. 6 represent physical components, FIG. 6 is not intended to be a detailed hardware diagram; thus, many of the components depicted in FIG. 6 may be realized by common constructs or distributed among additional physical components. Moreover, it is contemplated that other existing and yet-to-be developed physical components and architectures may be utilized to implement the functional components described with reference to FIG. 6.

This display portion 612 generally operates to provide a user interface for a user, and in several implementations, the display is realized by a touchscreen display. In general, the nonvolatile memory 620 is non-transitory memory that functions to store (e.g., persistently store) data and processor-executable code (including executable code that is associated with effectuating the methods described herein). In some embodiments for example, the nonvolatile memory 620 includes bootloader code, operating system code, file system code, and non-transitory processor-executable code to facilitate the execution of a method described with reference to FIGS. 2, 3, 4, and/or 7 described above.

In many implementations, the nonvolatile memory 620 is realized by flash memory (e.g., NAND or ONENAND memory), but it is contemplated that other memory types may be utilized as well. Although it may be possible to execute the code from the nonvolatile memory 620, the executable code in the nonvolatile memory is typically loaded into RAM 624 and executed by one or more of the N processing components in the processing portion 626.

The N processing components in connection with RAM 624 generally operate to execute the instructions stored in nonvolatile memory 620 to enable calculations of desired states based on traits and device feedback. For example, non-transitory, processor-executable code to effectuate the methods described with reference to FIG. 4 may be persistently stored in nonvolatile memory 620 and executed by the N processing components in connection with RAM 624. As one of ordinarily skill in the art will appreciate, the processing portion 626 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 626 may be configured to effectuate one or more aspects of the methodologies described herein (e.g., the method described with reference to FIG. 5). For example, non-transitory processor-readable instructions may be stored in the nonvolatile memory 620 or in RAM 624 and when executed on the processing portion 626, cause the processing portion 626 to perform a method for communicating with an IoT/connected device. Alternatively, non-transitory FPGA-configuration-instructions may be persistently stored in nonvolatile memory 620 and accessed by the processing portion 626 (e.g., during boot up) to configure the hardware-configurable portions of the processing portion 626 to effectuate the functions of the host platform 120 and 220 as well as the calculator 207 and traits engine 106.

The input component 630 operates to receive signals (e.g., action intents 108 or traits from a traits catalog 122) that are indicative of one or more data inputs to the calculator 207. The signals received at the input component may include, for example, traits, action intents 108, state 110, and properties 112. The output component generally operates to provide one or more analog or digital signals to effectuate an operational aspect of the host platform 120, 220, the calculator 207, the traits engine 106, the connector 114, the selector 111, and/or any of the modules described in relation to FIG. 3. For example, the output portion 632 may provide the action intent or desired state provided to the IoT device, as described with reference to FIG. 1. When the output component is realized by the traits engine 106, for example, the output signal may be an action intent and/or desired state being passed to the selector 111.

The depicted transceiver component 628 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for communicating with connected devices, the method comprising:
    identifying one or more traits for a connected device;
    receiving, from a first computing device, an action request, wherein the action request corresponds to a first desired state of the connected device;
    receiving, via an internet or cellular data connection, a trait configuration for the one or more traits corresponding to the connected device;
    calculating, at a controller, a second desired state for the connected device, wherein the second desired state is calculated based on the action request and the trait configuration for the connected device, and the second desired state differs from the first desired state;
    calculating an expected state for the connected device, the expected state based upon one or more of the action request, a behavior model, and the trait configuration for the connected device;
    transmitting a first message to the connected device, the first message including an indication of the second desired state;
    receiving, from the connected device, a reported state;
    determining at least one error or issue for the connected device based on identifying a discrepancy between the reported state and the expected state; and
    transmitting a second message to the first computing device, the second message including an indication of an estimated state of the connected device and an indication of the error or the issue.

2. The method of claim 1, further comprising:
    refraining from transmitting to the connected device information pertaining to the action request based on the estimated state of the connected device.

3. The method of claim 1, further comprising:
    receiving one or more state snapshots for the one or more traits for the connected device, wherein each of the one or more state snapshots comprises one or more state fields.

4. The method of claim 3, further comprising:
    receiving one or more of an updated trait configuration, and an updated state snapshot for at least one of the one or more state snapshots, for the connected device, based on transmitting the request to the connected device; and
    calculating a third desired state for the connected device.

5. The method of claim 1, wherein each of the one or more traits is associated with one or more of a capability, a functionality, and a behavior of the connected device.

6. The method of claim 1, further comprising:
    calculating an expected state, the expected state based upon one or more of the action request, a behavior model, and the trait configuration for the connected device;
    determining an error or issue for the connected device based on one of:
        receiving a reported state from the connected device, wherein the reported state is different from the expected state; and
        identifying an absence of an error response, an updated state, or a reported state from the connected device; and
    transmitting a third message to the connected device, the third message including an indication of a third desired state for the connected device, and wherein the third message is transmitted based upon determining the error or the issue for the connected device.

7. The method of claim 1, further comprising:
    receiving, from the connected device, a reported state; and
    refraining from transmitting information pertaining to the action request to the connected device based at least in part on identifying that the first desired state is the same as or approximately the same as the reported state.

8. The method of claim 1, further comprising:
    validating the action request, wherein the validating comprises assessing the action request with respect to the trait configuration for the connected device;
    generating an action intent from the action request, wherein generating the action intent is based at least in part on validating the action request; and
    wherein calculating the second desired state is further based on the action intent and a reported state of the connected device.

9. A method for communicating with connected devices, the method comprising:
    identifying one or more traits for a connected device;
    receiving, from a first computing device, an action request, wherein the action request corresponds to a first desired state of the connected device;
    receiving, via an internet or cellular data connection, a trait configuration for the one or more traits corresponding to the connected device;
    calculating, at a controller, a second desired state for the connected device, wherein the second desired state is calculated based on the action request and the trait configuration for the connected device, and the second desired state differs from the first desired state;
    transmitting a first message to the connected device, the first message including an indication of the second desired state;

transmitting a second message to the first computing device, the second message including an indication of an estimated state of the connected device;

receiving a traits payload for the connected device, the traits payload comprising the trait configuration and a state snapshot;

parsing the traits payload, based at least in part on sourcing one or more data contracts, the one or more data contracts selected from a group consisting of configuration property definitions, state property definitions, and action definitions;

receiving additional trait data for the connected device, the additional trait data including information pertaining to one or more validation sources, trait constraints, and action validations; and validating one or more of a pending state update and a pending property update for the connected device based on the parsed traits payload and the additional trait data.

10. A system configured for communicating with connected devices, the system comprising:
one or more hardware processors configured by machine-readable instructions to:
identify one or more traits for a connected device;
receive, from a first computing device, an action request, wherein the action request corresponds to a first desired state of the connected device;
receive, via an internet or cellular data connection, a trait configuration for the one or more traits corresponding to the connected device;
calculate a second desired state for the connected device, wherein the second desired state is calculated based on the action request and the trait configuration for the connected device, and the second desired state differs from the first desired state;
calculate an expected state for the connected device, the expected state based upon one or more of the action request, a behavior model, and the trait configuration for the connected device;
transmit a first message to the connected device, the first message including an indication of the second desired state;
receive, from the connected device, a reported state;
determine at least one error or issue for the connected device based on identifying a discrepancy between the reported state and the expected state; and
transmit a second message to the first computing device, the second message including an indication of an estimated state of the connected device and an indication of the error or the issue.

11. The system of claim 10, wherein the one or more hardware processors are further configured by the machine-readable instructions to:
refrain from transmitting to the connected device, information pertaining to the action request based on the estimated state of the connected device.

12. The system of claim 10, wherein the one or more hardware processors are further configured by the machine-readable instructions to:
receive one or more state snapshots for the one or more traits for the connected device, wherein each of the one or more state snapshots comprises one or more state fields.

13. The system of claim 12, wherein the one or more hardware processors are further configured by the machine-readable instructions to:
receive one or more of an updated trait configuration, and an updated state snapshot for at least one of the one or more state snapshots, for the connected device, based on transmitting the first message to the connected device; and
calculate a third desired state for the connected device.

14. The system of claim 10, wherein each of the one or more traits is associated with one or more of a capability, a functionality, and a behavior of the connected device.

15. The system of claim 10, wherein the one or more hardware processors are configured by the machine-readable instructions to:
calculate an expected state, the expected state based upon one or more of the action request, a behavior model, and the trait configuration for the connected device;
determine an error or issue for the connected device based on one of:
receiving a reported state from the connected device, wherein the reported state is different from the expected state; and
identifying an absence of an error response, an updated state, or a reported state from the connected device; and
transmit a third message to the connected device, the third message including an indication of a third desired state for the connected device, and wherein the third message is transmitted based upon determining the error or the issue for the connected device.

16. A non-transient computer-readable storage medium having instructions embodied thereon, the instructions being executable by one or more processors to perform a method for communicating with connected devices, the method comprising:
identifying one or more traits for a connected device;
receiving, from a first computing device, an action request, wherein the action request corresponds to a first desired state of the connected device;
receiving, via an internet or cellular data connection, a trait configuration for the one or more traits corresponding to the connected device;
calculating, at a controller, a second desired state for the connected device, wherein the second desired state is calculated based on the action request and the trait configuration for the connected device, and the second desired state differs from the first desired state;
calculating an expected state for the connected device, the expected state based upon one or more of the action request, a behavior model, and the trait configuration for the connected device;
transmitting a first message to the connected device, the first message including an indication of the second desired state;
receiving, from the connected device, a reported state;
determining at least one error or issue for the connected device based on identifying a discrepancy between the reported state and the expected state; and
transmitting a second message to the first computing device, the second message including an indication of an estimated state of the connected device and an indication of the error or the issue.

17. A non-transient computer-readable storage medium having instructions embodied thereon, the instructions being executable by one or more processors to perform a method for communicating with connected devices, the method comprising:
identifying one or more traits for a connected device;
receiving, from a first computing device, an action request, wherein the action request corresponds to a first desired state of the connected device;

receiving, via an internet or cellular data connection, a trait configuration for the one or more traits corresponding to the connected device;

calculating, at a controller, a second desired state for the connected device, wherein the second desired state is calculated based on the action request and the trait configuration for the connected device, and the second desired state differs from the first desired state;

transmitting a first message to the connected device, the first message including an indication of the second desired state;

transmitting a second message to the first computing device, the second message including an indication of an estimated state of the connected device;

receiving a traits payload for the connected device, the traits payload comprising the trait configuration and a state snapshot;

parsing the traits payload, based at least in part on sourcing one or more data contracts, the one or more data contracts selected from a group consisting of configuration property definitions, state property definitions, and action definitions;

receiving additional trait data for the connected device, the additional trait data including information pertaining to one or more validation sources, trait constraints, and action validations; and validating one or more of a pending state update and a pending property update for the connected device based on the parsed traits payload and the additional trait data.

* * * * *